April 15, 1952 R. O. GREENSHIELDS 2,593,139
PLOWSHARE MANUFACTURE
Filed April 24, 1946
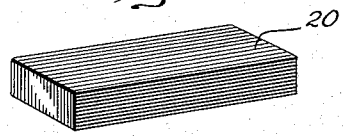
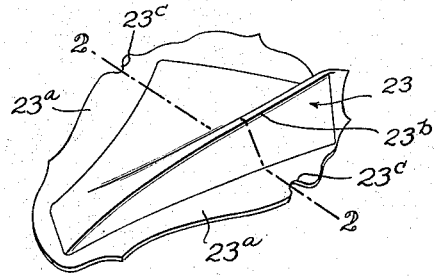
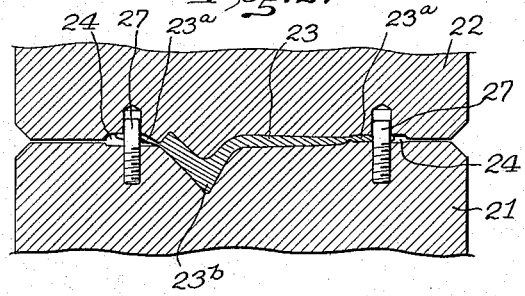
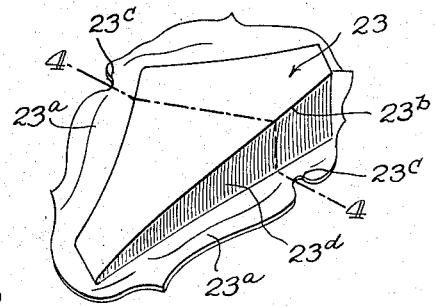
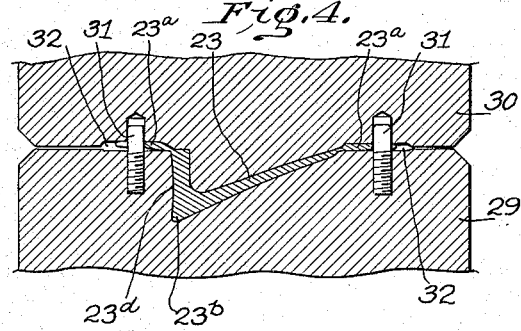
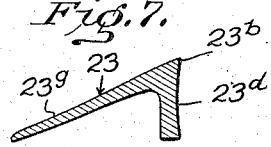
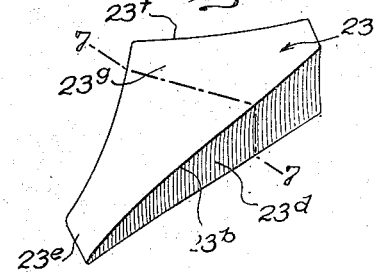
Robert O. Greenshields
INVENTOR
BY
ATTORNEY Patented Apr. 15, 1952

2,593,139

UNITED STATES PATENT OFFICE 2,593,139

PLOWSHARE MANUFACTURE

Robert O. Greenshields, Detroit, Mich., assignor to The Budd Company, a corporation of Pennsylvania Application April 24, 1946, Serial No. 664,636

2 Claims. (Cl. 29—14)

This invention relates to the manufacture of plowshares and has for an object the provision of improvements in this art.

One of the particular objects of the invention is the provision of an improved method of manufacturing plowshares which will be suitable for high-speed mass-production operations.

Full-size plowshares comprise a landside portion or gunwale (sometimes called gunnel) and a wing portion or blade. The gunwale is relatively very thick and the blade is very thin, and besides the over-all shape is very irregular, hence it is very difficult to make the article. This difficulty is increased by the very high requirements of quality and surface wear resistance required of the article.

Because of the great difficulties in making the article in one piece, it was for a long time the rather general practice to make the gunwale in one piece from thick stock, to make the blade in another piece, and to weld these parts together with the upper edge of the gunwale disposed beneath the lower surface at the inner edge of the blade. But again there were difficulties caused by the greatly varying cross-sectional dimensions throughout the article, in particular the point being very thin in comparison with other parts along the gunwale. In heating the thicker sections to welding temperature, the point would burn off and during welding the thin point and blade would cool more quickly than the thick body of the gunwale, producing uncertain and unequal weld conditions. In electric flash welding, particularly, it was difficult to obtain a uniform flow of current and uniform heating of the weld joint. And since flash welding, to be satisfactory, requires the melting and loss of a small amount of metal from the adjacent part on each side of the joint, the thin wing would become so much thinner after welding as to be considerably weakened at the place where it should be strongest.

More recently it has been the practice to make the gunwale and a short portion or stub of the blade in one angular piece which may be referred to as the plowshare point, to make the outer part of the blade in another piece, and then to flash weld the two parts together along the length of the blade. By so doing, a weak and uncertain joint at the angle is avoided and such metal as is lost at the weld may be pre-calculated and compensated. A better weld is made because equal sections and uniform current flow, hence uniform temperatures, are present at the weld line.

The present invention aims to improve the last-mentioned process by providing a better method of making the angular piece or point comprising the gunwale and stub-wing. The present method includes the feature of die-forging, stamping or coining the angular part and is particularly advantageous and economical because it permits all forming operations to be performed with one heating. Instead of removing the flash or surplus metal from the first stamping operation, it is left on the blank and usefully employed for positioning the blank for the next operation. And the first set of die-forging, coining or stamping dies, instead of forming a flat blank, form at once a partially bent blank which can be completed in a single further die-forging or stamping and final shaping operation.

The objects and advantages of the invention will be more apparent from a description of an exemplary embodiment, reference being made to the accompanying drawings, wherein:

Fig. 1 is a perspective view of a billet after being cut from a bar of stock and ready for heating and die-forging;

Fig. 2 is a cross-section through the first set of forging dies with a formed blank therein and showing the elements for forming indexing notches in the flash or overflow;

Fig. 3 is a top perspective view of the blank showing the indexing notches formed therein;

Fig. 4 is a cross-section through the second set of forging dies with the finished blank therein and showing the positioning elements;

Fig. 5 is a top perspective view of the blank when removed from the finishing dies;

Fig. 6 is a top perspective view of the blank after the flash or overflow has been trimmed off; and Fig. 7 is a section taken on the line 7—7 of Fig. 6.

A billet 20 may be used to form the blank. This billet is preferably of regular section rolled shape, such as polygonal, round, or the like. It is here shown as of rectangular section. These billets are adapted to be cut from a long rolled bar and are of a convenient shape to be heated in an electric induction furnace which provides clean heat and avoids scaling.

The billet is heated to a high temperature, say white heat or around 2100° F. for high carbon steel, and is placed in the lower die 21 of a forging die press. It is struck a heavy sudden blow by an upper forging die 22 and thereby is formed into a blank 23 with flash 23a going into the overflow cavities 24 of the dies.

The lower die has a relatively deep depression and the upper die, a corresponding mating V-shaped projection, which together tend to squirt the metal outward and form a pronounced angle in the blank along the portion which subsequently is to form the sharp front edge or shin 23b of the point. In a lower die of this shape the billet lies stably, even if round, and is not displaced during the forging action.

In this first forging operation the metal is moved substantially the full amount required so that each portion of the blank has approximately its final cross-sectional dimension. However, the rib 23b, which is to form the shin, is left with slightly more metal than required and the blank in general is left slightly thicker than finally required so that the mold die may be completely filled and some outflow of metal provided in the next operation.

One or both of the dies 21, 22 is provided with a plurality of indexing elements 27 against which the flash stops to form positioning points 23c in the flash. The flash is not trimmed off at the first forging stage, as has heretofore been done, but is left on the blank to aid in positioning it in the dies for subsequent operations.

The forged blank of Fig. 3 is placed in a final forging or finishing press between dies 29, 30 and given its final shape, the positioning points 23c fitting the indexing elements 31 of the dies. Additional flash is caused to flow out with the original flash 23a into overflow cavities 32 of the dies. Still a slight excess of metal is left in the rib 23b and pushed over toward the gunwale side 23d. This leaves the gunwale side slightly overhanging at the shin, i. e. slightly concave, so that a sharp shin may be formed after grinding to final shape.

The blank now appears as shown in Fig. 5 and at this stage the flash 23a is trimmed off. It is left in such position that it may be cut off by suitably shaped dies and practically no grinding or machining is required on account of the flash.

The final blank after trimming is shown in Figs. 6 and 7. Here the point proper is identified as 23e and the outer edge which is to fit against or be flash butt welded to the share wing is identified as 23f. The stub-wing is designated as 23g.

The method permits of very rapid operations and avoids all necessity for reheating. The article is thereby kept very clean and free from scale and this minimizes injury to the dies and blemishes in the article. If there is any tendency for the blank to spring back in the final-forging operation it may be re-struck to kill this springback. Preferably it is re-struck in the same dies 29, 30 which give it its final form; but this could be made a two-stage action with separate dies for very rapid line production.

While one embodiment has been described it is to be understood that the invention may have various embodiments within the limits of the prior art and the scope of the subjoined claims.

I claim:
1. The method of die-forming an article, such as a non-symmetrical plowshare point, in successive die sets which do not provide a positioning fit with the blank itself at successive stages, which method comprises, die-forming a blank in one set of dies and in the same operation forming flash on the blank with rotationally positioning indexing elements in the flash, transferring the blank with flash to a second die set with the indexing elements of the flash interfitting with mating indexing elements of the second die set to position the blank rotationally in the second die set for proper striking, and die-forming the blank in the second die set.

2. The method of hot die-forming an article, such as a non-symmetrical plowshare point, without re-heating an intermediate blank form of irregular shape and avoiding trouble with scale due to feasible methods of re-heating such an irregular blank shape, which method comprises, heating a billet of regular shape in a heating furnace, such as an electric induction furnace which does not induce the formation of scale, hot die-swaging the billet to form a blank of irregular shape in one set of dies and in the same operation forming flash on the blank with rotationally positioning indexing elements in the flash, transferring the blank with flash to a second die set with the indexing elements of the flash interfitting with mating indexing elements of the second die set to position the blank rotationally in the second die set for proper striking, and with the same heat die-forming the blank in the second die set and in the same operation forming further flash while leaving the indexing elements on the flash, and in a subsequent operation cutting off the flash.

ROBERT O. GREENSHIELDS.

REFERENCES CITED

The following references are of record in the file of this patent:

UNITED STATES PATENTS

| Number | Name | Date |
|---|---|---|
| 1,558,419 | White | Oct. 20, 1925 |
| 2,360,354 | Lyon | Oct. 17, 1944 |

FOREIGN PATENTS

| Number | Country | Date |
|---|---|---|
| 12,373 | Great Britain | Aug. 4, 1894 |